Figure 1:
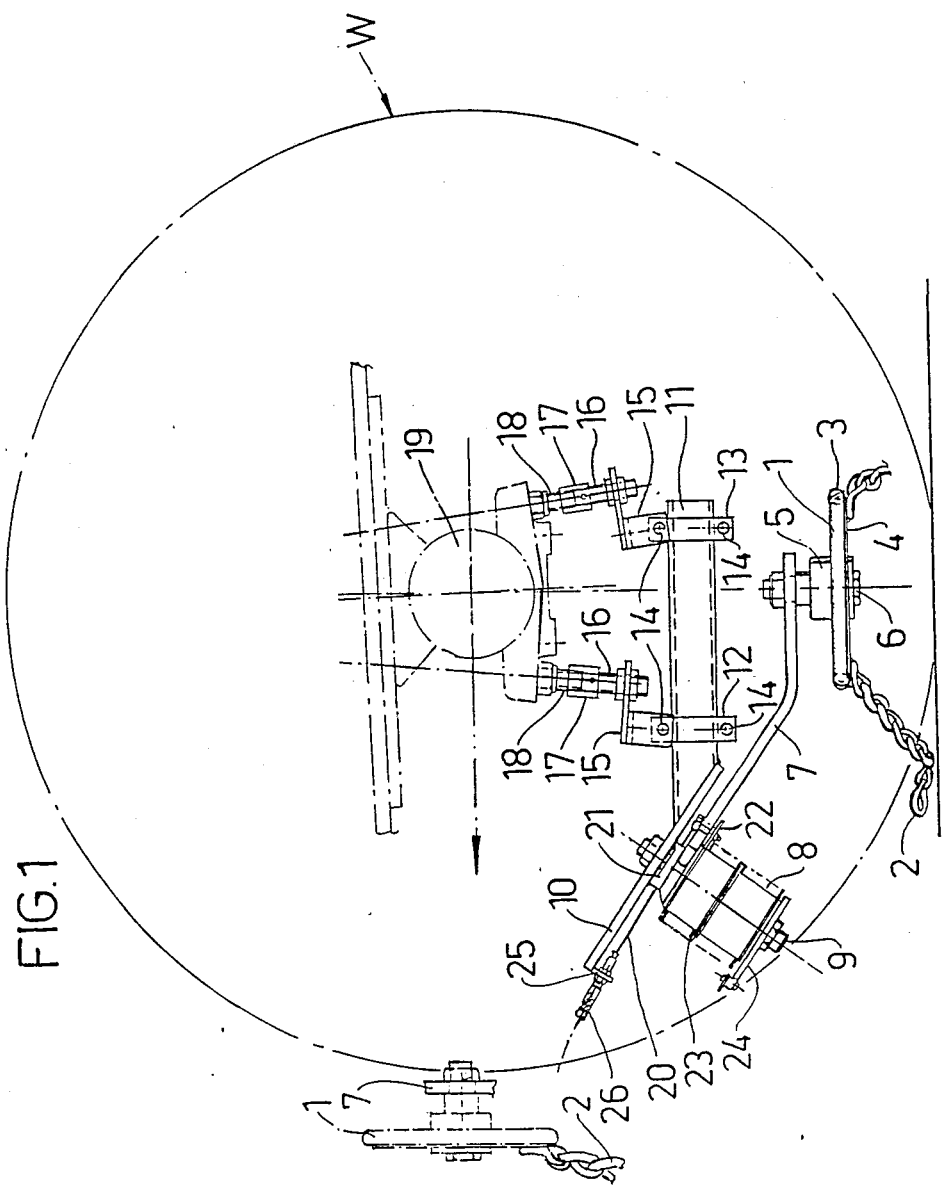

United States Patent [19]

Andersson et al.

[11] Patent Number: 4,800,992

[45] Date of Patent: Jan. 31, 1989

[54] ANTI-SKID DEVICE

[75] Inventors: Olle Andersson, Linköping; Lennart Carlsson, Skänninge, both of Sweden

[73] Assignee: Onspot AB, Linkoping, Sweden

[21] Appl. No.: 918,536

[22] Filed: Oct. 14, 1986

[30] Foreign Application Priority Data

Mar. 1, 1985 [SE] Sweden ............................ 8501021
Feb. 28, 1986 [EP] European Pat. Off. ........ 86850074.5

[51] Int. Cl.$^4$ .............................................. B60T 1/00
[52] U.S. Cl. ........................................ 188/4 B; 74/13;
74/108; 74/110; 74/517; 74/500.5; 152/208
[58] Field of Search ............... 188/4 R, 4 B; 152/208;
74/517, 89.22, 108, 110, 501 R, 13

[56] References Cited

U.S. PATENT DOCUMENTS 2,277,036  3/1942  Chaussee ........................ 188/4 B Primary Examiner—Michael W. Ball
Assistant Examiner—Thomas Bokan
Attorney, Agent, or Firm—Goodman & Teitelbaum

[57] ABSTRACT

Anti-skid device of a kind that includes a chain-provided pulley that on use if brought to contact with the side of the vehicle wheel so that when the vehicle wheel is rotated the chain pieces (2) are successively thrown in between wheel and ground in order to improve the traction. The anti-skid device is rotatably journaled in an arm (7) that in turn is fastened to a housing (8) that is turnably journaled on a stub axle (9). The turning movement of the arm and the housing is achieved in one direction by a bowden wire (20) and in the other direction by a return spring (23). The stub axle (9) of the housing (8) is fastened to a plate (10) that in turn is fastened to a tube (11) by means of welding. The tube (11) is in turn arranged in clamps (12 and 13), that in turn are fastened to the bolts holding together the vehicle axle and its spring. Since the fastening tube (11) is held in clamps (12 and 13) the device according to the invention can be displaced lengthwise of the vehicle as well as it can be given different movement paths between parking and working position by turning the tube (11) in the clamps (12 and 13). In this way a step-by-step adjustment of the working position of the device is possible and thereafter the best movement path between the two positions can be chosen.

16 Claims, 6 Drawing Sheets

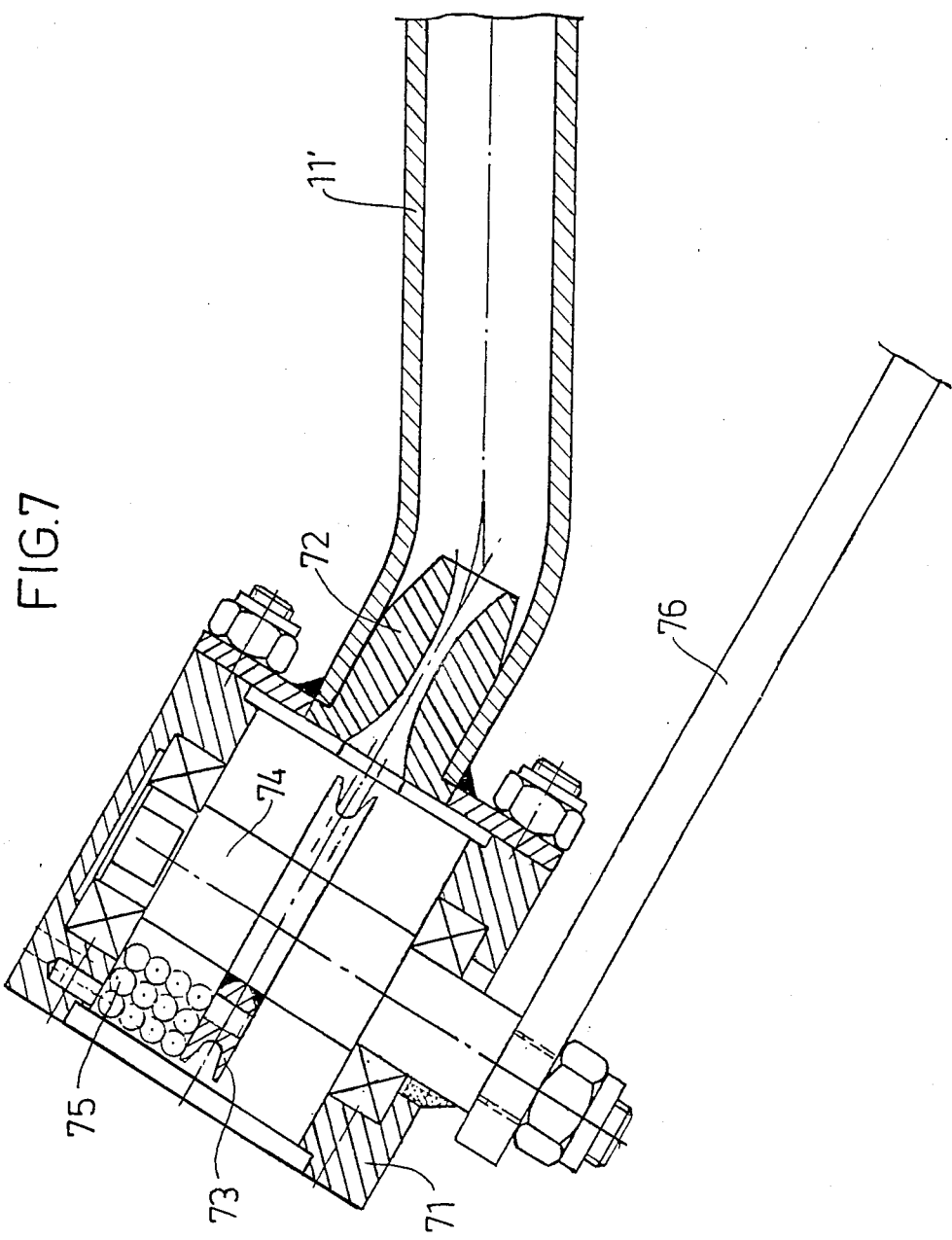

ANTI-SKID DEVICE

This invention concerns an anti-skid device of the type that includes a chain-provided pulley that when activated is brought to contact against the side of a vehicle wheel in order to be given a rotation that successively throw chainpieces in between ground and wheel in order to improve the grip of the supporting surface.

Anti-skid devices of this kind are known for heavy lorries and trucks where these regretfully comparatively expensive anti-skid devices have been able to motivate their costs. Furthermore big lorries and trucks allow the space that is necessary for mounting of anti-skid devices of this kind. One reason why anti-skid devices of this kind is comparatively expensive is the great variations between different types and varieties of trucks and lorries, that have required variations in mounting as well as function, to which also comes that it has been necessary to make different devices for left and right side. Concerning anti-skid devices for smaller lorries and trucks these have thus far been missing among other things due to the known constructions being too expensive. This despite that the need is particularly great as seen against the background that small lorries often are considerably heavy in the front but are provided with rear wheel drive, i.e. in empty condition a comparatively bad traction ability.

In view of the above the object of the invention is to obtain an easily adaptable and mountable anti-skid device in particular for smaller lorries, with reasonable production and mounting costs. In accordance with the invention this object is solved by the means for establishing the movement of the pulley from its parking position to its working position in contact with a vehicle wheel being fastened to the vehicle or the axle thereof by a tube that is retained in one or more clamps, lengthwise of the vehicle.

By means of the mounting comprising a tube held fast in clamps adjustment in two directions is made possible, anglewise and lengthwise entirely stepless at the same time as the locking forces becomes so great that no risk for movements or alterations of the adjusted position exists. In this way the possibility is also obtained to use the same mounting for the right as well as the left side, which is cost-saving.

Further advantageous developments of the invention are apparent from the following description of a preferred embodiment of the invention. In the drawings FIG. 1 shows the invented device seen from the side,
FIG. 2 a detail thereof,
FIG. 3 the activation device,
FIGS. 4 and 5 mounting details,
FIG. 6 yet another embodiment of the invention and
FIG. 7 a further embodiment.

As is apparent from FIG. 1 the anti-skid device includes a chain-provided pulley 1 on which chain pieces 2 are passed. The chain-provided pulley 1 includes a circular ring 3 fastened to a disk 4. To the disk 4 is in turn the pieces 2 of chain fastened as well as the bearing housing 5. The chain-provided pulley 1 is via two ball bearings in the bearing housing 5 arranged on a bolt 6 that is fastened on an arm 7. The arm 7, which as well as the chain wheel 1 in FIG. 1 is shown in the working position of the device, is from a flat material so that some adaptations of the device can take place by bending or turning the arm 7.

The arm 7 is fastened to a further bearing housing 8. In the bearing housing 8 two ball bearings are arranged with a distance between them and on a pin 9. The pin 9 is in turn unturnably fastened to a plate 10 that in turn is welded to a tube 11. The tube 11 is held in two clamps 12 and 13 respectively by means of bolts 14 compressing the two slotted clamps 12 and 13. Both the clamps 12 and 13 are via angles 15 fastened to short threaded rod pieces 16. These threaded rods are then by means of internally threaded pipes or long nuts 17 fastened to the extending bolt ends 18 of the bolts holding the axle 19 of the vehicle wheel W to its springs. The nuts 17 are locked by pins on the threaded rod pieces 16.

This mounting is adaptable to the right and the left side respectively and allows by turning and displacement of the tube 11 in the clamps 12 and 13 a particularly good adaption even if the mounting circumstances varies. Furthermore by means of the angles an adjustment of the angle of the tube 11 relative the ground and thereby the longitudinal angle of the chain-provided pulley can be achieved. The longitudinal angle of the chain-provided pulley is very essential since this to secure good function must be placed comparatively exactly relative to the centre of the wheel and furthermore the chains must be thrown in a rather precisely defined position over the ground in order to secure optimum use of the chains. Location of the chain-provided pulley at the centre of the vehicle wheel is primarily done by longitudinal displacement of the tube 11 and the clamps 12 and 13 while the adjustment of the height of the chain-provided pulley can be made by means of adjusting the angles on the threaded pieces 16 or by deforming of the arm 7.

Since the plate 10 is fastened to the tube 11 with a relative angle the arm 7, when it is turned from its working position towards its dashed shown parking position in FIG. 1, is swiveled up from the ground, which primarily prevents the chains from dragging against the ground and secondly reduces the risk for damages to chain-provided pulley and arm by upstanding objects.

Figure 2:
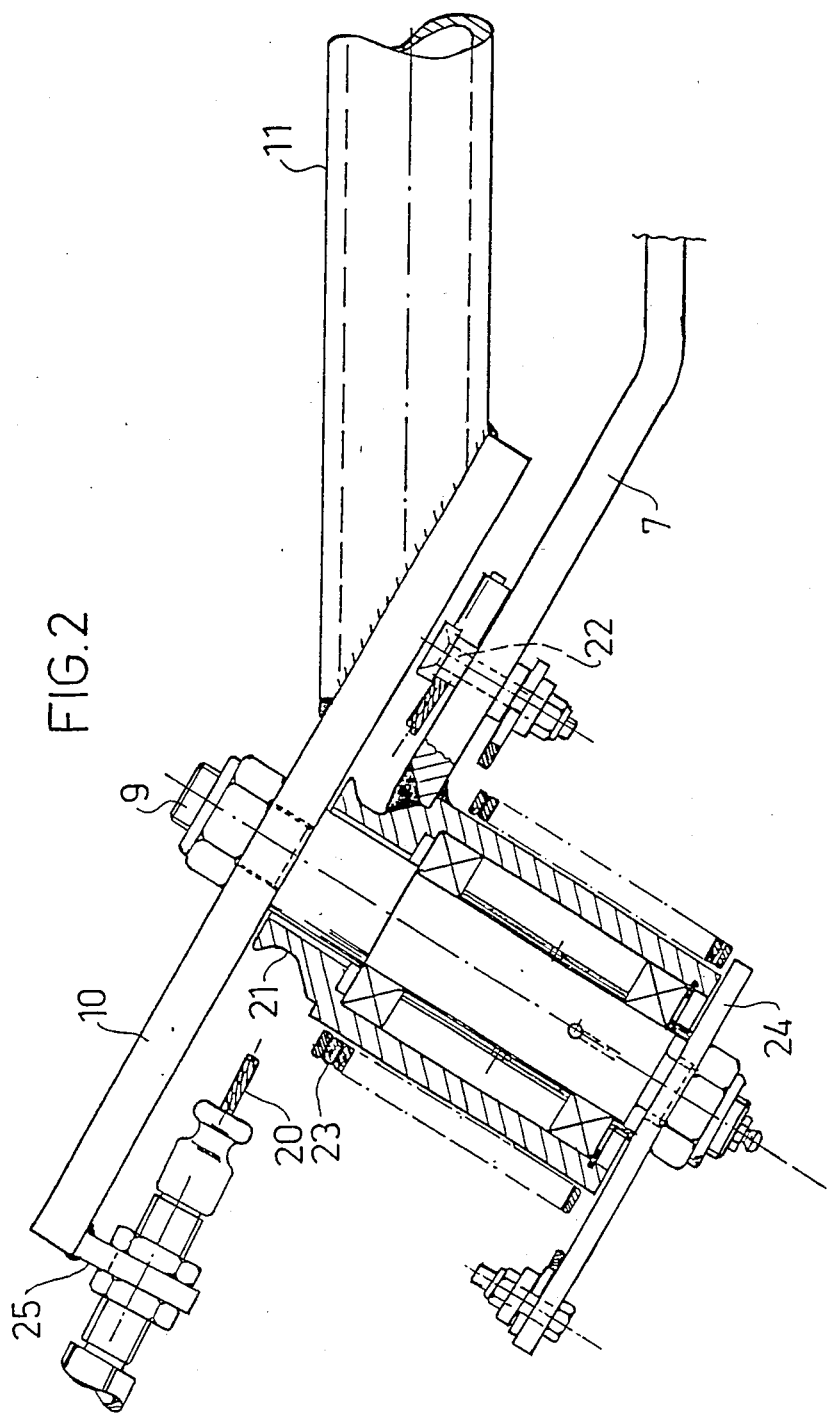

In order to provide an activation pull on the arm 7 and thereby swivel the chain-provided pulley 1 down to the working position a pulling wire 20 is arranged. The pulling wire runs over a pulley 21 constituting a part of the bearing housing 8 and is fastened to the arm 7 at the wire fastening 22. In order to when the wire 20 stops pulling the arm 7 towards the vehicle wheel return the arm to the parking position a helical spring 23 is arranged on the outer side of the bearing housing 8 and the helical spring 23 has a rectangular cross section. The spring 23 is in one end fastened to the wire fastening 22 and in the other end to a washer 24 fastened to the axle pin or shaft 9, as best shown in FIG. 2. The washer 24 is held to the axle pin 9 only by means of the friction that results at the tightening of the bearings on the axle pin. In this way it is possible to tension the spring 23 to the desired amount. Due to the great number of turns of the spring there is room around the bearing housing and it is possible for the spring 23 to allow a return movement over a sufficiently great angle with a sufficient force. Due to the rectangular cross section there is no risk of the spring being closed by dirt. In order to counteract the fact that the reaction force of the spring increases as the arm comes closer to the vehicle wheel the pulley 21 is preferably arranged excentrically so that the force from the wire 20 receives its greatest torque arm when the chain-provided pulley 1 comes in contact with the vehicle wheel.

Figure 3:
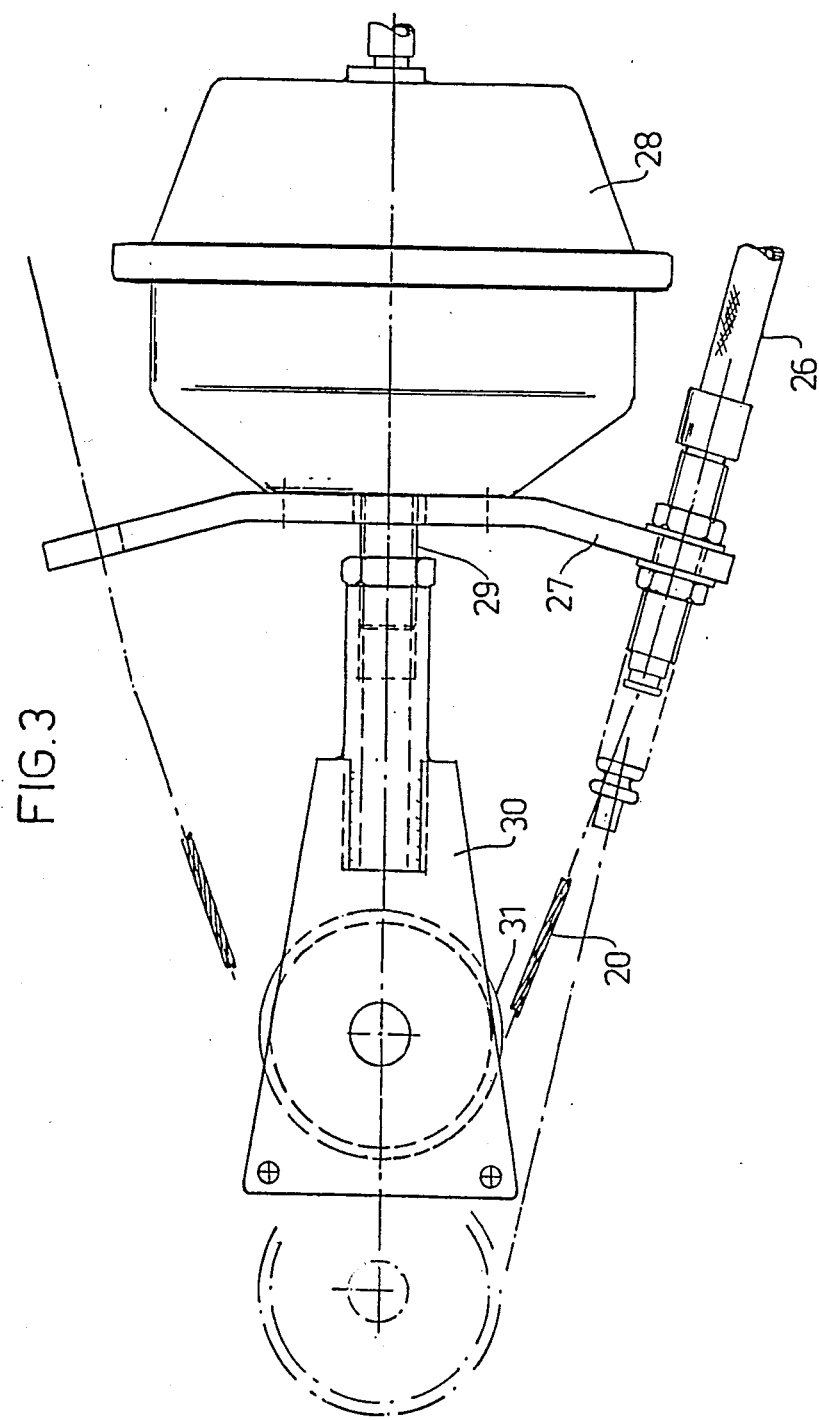

The wire 20 is bowden wire the casing of which is fastened to the plate 10 in a fastening 25. The other end of the wire casing 26 is fastened to a plate 27, as shown in FIG. 3. To this plate is furthermore fastened a pressure air cylinder 28 with a push rod 29 fastened to a fork-like device 30 carrying a pulley 31 for the wire 20. Via this pulley 31 the wire 20 runs out in a new casing 26 to a similar anti-skid device at the other end of the vehicle wheel axle. On activation of the anti-skid device the pressure air cylinder 28 is activated and pushes out its push rod 29 which in turn means that by means of the pulley 31 the wire 20 is tensioned and pulls arms 7 on both sides of the vehicle. In this way it is possible to manage with only one pressure air cylinder, which means a saving.

For additional adjustability of the inventive device additional mounting holes for the axle 9 may be arranged in the plate 10, preferably placed on a line cutting the central line of the tube 1.

Through the use of bowden wires for maneuvering the anti-skid device it is possible to place the pressure air cylinder just anywhere on the vehicle where there is room. In the shown embodiment the parking position of the anti-skid device is in front of the wheel axle where in general most space exist.

Figure 5:
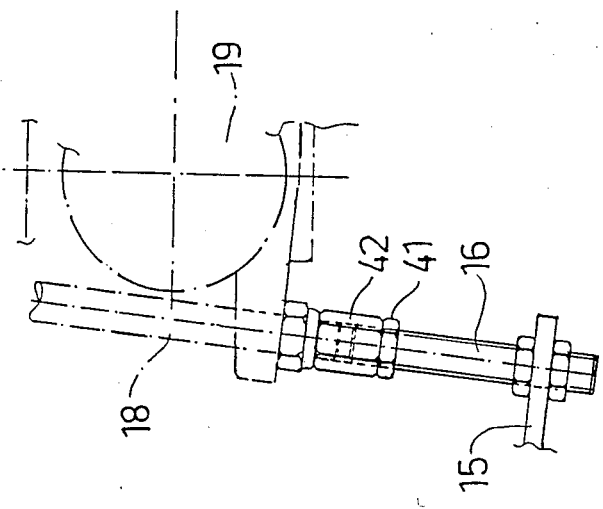
Figure 4:
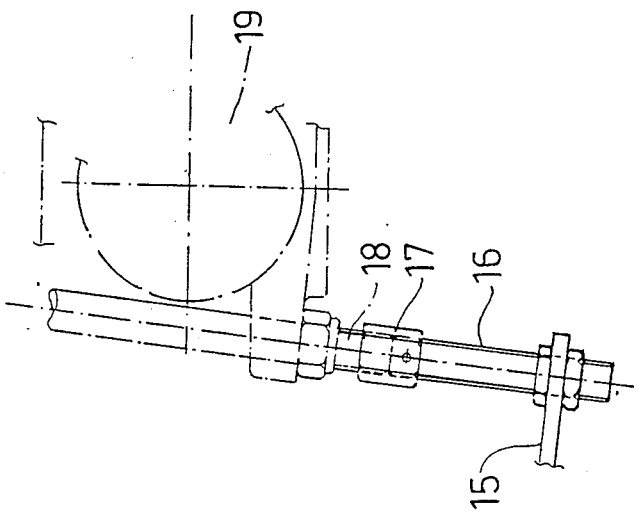

Above it has been described how the device of the invention is mounted when the available part for mounting of those bolts that hold axle and spring together are long, as best shown in FIG. 4. If the bolts do not project that far the procedure shown in FIG. 5 is used. The threaded rod is not locked against the end of the bolt 18 but instead a locking nut 41 is used tightened against the lower side of the uniting nut 42.

Essential for both shown mounting methods is however that the existing construction is not disturbed, nor so that details are demounted and remounted or details being exchanged.

Figure 6:
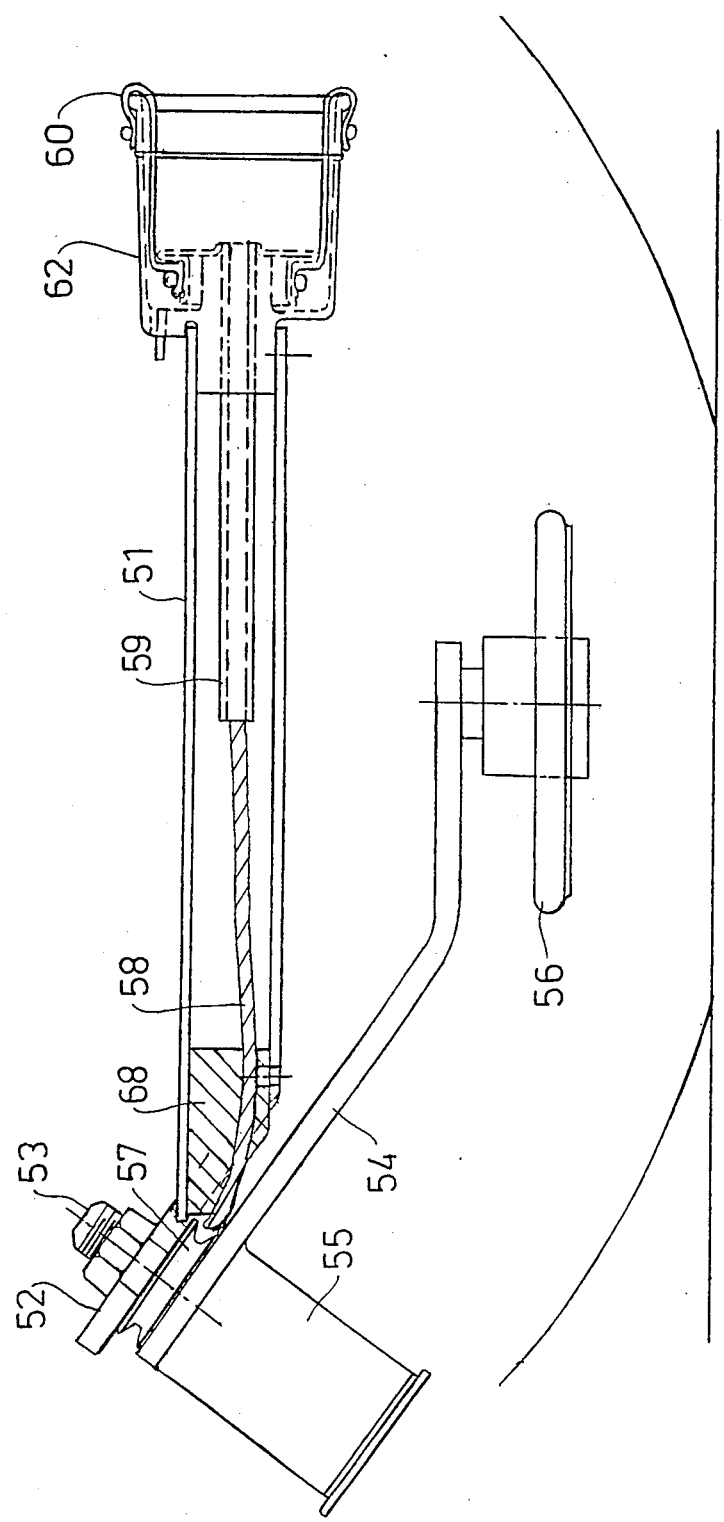

In FIG. 6 is finally shown how a mounting device similar to that described in the above embodiment also can be used together with a slightly different type of activation mechanism. To the tube 51 is in the same way as above fastened an angled plate 52, to which a stub axle 53 is fastened and round which an arm 54 with accompanying spring 55 and pulley 56 is moveable. To the arm is in the same way as in the above mentioned example fastened a pulley 57 over which wire 58 runs. The wire 58 goes from the pulley through a guide 68 in the end of the tube at the plate into the inner of the tube. The guide 68 is chamfered so that it gives an appropriate guiding of the wire and is preferably made of a low friction material (or at least the bushing through which the wire runs).

Inside the tube 51 the wire is then fastened to a pulling rod 59 that is activated by a bellowlike device 60 arranged in the other end of the tube. The bellow 60 is of the type of a rolling bellow with a housing 62. When air with sufficient pressure is entered into the housing the bellow goes out of the housing and gives a sufficiently long movement to turn the arm the necessary angle. As the pressurized air is removed the return spring of the arm draws bellow and arm back to the starting position.

Within the frame of the invention it is of course possible to consider other maneuvering devices making use of the tube itself. For instance one can consider the possibility of having a rack and pinion maneuvering device. The tube provides the guiding of the rack and it is also possible to place the return spring inside the tube. The tube can of course also constitute the working cylindre of the hydraulic or air pressure device.

In FIG. 1 is shown the working position and the parking position. Depending on the angle of the tube 11 in the clamps 12 and 13 the path that a chain-provided pulley will follow between those two positions will vary. And as a result it is possible to give the chain-provided pulley a curved path passing objects that would otherwise be in its way. This adjustment can be made without effecting the working position or the parking position. The only thing that is effected is the lateral angle of the pulley in its working position. This angle however has a very little influence on the position in which the chains are shown in under a vehicle wheel. It is thus possible after adjusting lengthwise and heightwise the working position of the chain-provided pulley to adjust its path of movement between its working position and parking position in a very simple manner by only turning the tube. This means that the adjustment of the device is a simple step-by-step procedure that can also be carried out by people without previous experience of the invented device, which has not been possible with the previously known technique.

In order to obtain the best conditions for the return spring one always tries to obtain a path that is as flat as possible between working position and parking position. But by turning the tube the circular movement can either be made to pass over or under objects that are in the way. In FIG. 7 a further embodiment of the invention is shown. The general idea remains the same with a fastened tube 11'. In this embodiment as in the embodiment of FIG. 6 the wire is enclosed inside the tube. In the embodiment of FIG. 7 however the wire and its pulley as well as the spring are enclosed in a housing 71. Between the housing and the tube 11' a plastic guide 72 for the wire is arranged, the guiding path through the guide 72 having a radius of curvature as large as possible. This guide 72 is rotationally symmetric so that if it is worn it can be rotated and it can thus have a very long useful life. Through the guide 72 the wire goes to the pulley 73 situated in the middle of the housing 71. On one or each side of the pulley a spring 75 may be arranged. The spring 75 is a helical spring with several layers in order to provide sufficient movement with a limited progressivity. The pulley is mounted on a short shaft 74 which is journaled in the housing and that in an outer end carries an arm 76 with a motion between parking position and working position of the chain provided pulley that is not shown. As shown in FIG. 7, the tube 11' is bent adjacent to the housing 71 to provide the angle between the tube 11' and the swivel axle 74 of the arm 76.

When the housing is mounted on the tube it is turned to the left or to the right for adopting the device to the left or to right side of the vehicle. Since the housing is symmetrical only one type of housing is required and since the pulley is placed centrally in the housing it is possible to use the same spring on left and right side simply by placing the spring on different sides of the pulley.

The embodiment of FIG. 7 is primarily intended to use with a bellow type mechanism or air cylinder similar to the embodiment of FIG. 6 but can of course, as well as the embodiment of FIG. 6, be used together with a bowden wire and power means provided somewhere else on the vehicle if the available space is too restricted.

We claim:

1. Anti-skid device for a vehicle comprising:
   a pulley (1) provided with chain pieces (2);
   activation means for moving said pulley (1) along a path between a parking position in which said pulley (1) is spaced from a vehicle wheel (W) and a working position in which said pulley (1) is in contact with a side of the vehicle wheel (W) so that said chain pieces (2) are successively thrown in between wheel and ground in order to increase traction there between;
   said activation means including an arm (7) having a swivel axle at one end to carry out a swivel movement for moving said pulley (1) between said parking and working positions;
   said pulley (1) being mounted on an opposite end of said arm (7);
   first and second adjustable means for fastening said arm (7) to the vehicle or its axle (19);
   said first adjustable means for heightwise adjusting of said pulley (1) relative to the ground when in said working position;
   said second adjustable means for lengthwise adjusting of said pulley (1) in a lengthwise direction of the vehicle when in said working position to position said pulley (1) along a verticle centre line of the vehicle wheel (W);
   said second adjustable means also for adjusting of said path of movement of said pulley (1) between said parking and working positions so that said pulley (1) avoids objects of the vehicle that would otherwise be in its way;
   said second adjustable means including a tube (11) fastened in at least one or more clamps (12, 13), said tube (11) being arranged essentially in said lengthwise direction of the vehicle;
   securing means connecting said tube (11) to said one end of said arm (7) for said arm (7) to move together with said tube (11) in the same direction while permitting said swivel movement of said arm (7) relative to said tube (11) so that, prior to fastening said tube (11), said tube (11) can be moved in said lengthwise direction of the vehicle to move said arm (7) together therewith in said lengthwise direction for said lengthwise adjusting of said pulley (1), and said tube (11) can also be turned about its axis to run said arm (7) together therewith for said adjusting of said path of movement of said pulley (1); and
   said arm (7) having said swivel axle angled relative to a center line of said tube (11) when in a plane corresponding to said working position.

2. Anti-skid device according to claim 1, the improvement wherein the tube (11) is essentially horisontal.

3. Anti-skid device according to claim 1, the improvement wherein the clamps (12, 13) for the tube (11) via angles (15) are fastened to bolts (18) holding together vehicle axle (19) and its spring.

4. Anti-skid device according to claim 1, the improvement wherein the arm (7) is mounted on a bearing housing (8) journaled on a stub axle (9) fastened to a plate (10) that is in turn fastened to the tube (11) with an obtuse angle there between.

5. Anti-skid device according to claim 1, the improvement wherein the movement of the arm (7) from the parking position to the working position is achieved by a pulling wire (20) running over a pulley (21) preferably excentric, fixedly mounted on a unit constituted by the arm and a bearing housing.

6. Anti-skid device according to claim 4, the improvement wherein the return movement of the arm (7) from the working position to the parking position is established by a helical spring (23) arranged on the outside of the bearing house (8).

7. Anti-skid device according to claim 6, the improvement wherein the helical spring (23) at one end is fastened to a wire fastening (22) at the arm (7) and at the other end to a washer (24) fastened to the stub axle (9) so that the spring can be pre-tensioned in a desired degree.

8. Anti-skid device according to claim 1, the improvement wherein the arm (7) carrying the chain-provided pulley (1) is made from blade or flat material.

9. Anti-skid device according to claim 1, the improvement wherein the tube is used to accommodate parts of a maneuvering mechanism provided for the movement of the arm.

10. Anti-skid device according to claim 5, the improvement wherein the wire from the pulley runs via a guiding piece of low friction material in a near end of the tube through the tube.

11. Anti-skid device according to claim 10, the improvement wherein the wire in a distal end of the tube is connected to an air cylinder or membrane device.

12. Anti-skid device according to claim 10, the improvement wherein the guiding piece is a rotationally symmetrical body.

13. Anti-skid device according to claim 1, the improvement wherein the arm carrying the chain provided pulley is mounted on a shaft that is in turn journaled in housing in which a pulley for a wire is mounted.

14. Anti-skid device according to claim 10, the improvement wherein a spring is arranged in the housing in the shape of a helical multi-layer wire spring.

15. Anti-skid device according to claim 1, the improvement wherein an angle between the tube and a swivel axle of the arm is achieved by a bend on the tube close to an end near the arm.

16. Anti-skid device according to claim 10, the improvement wherein a guiding path through the guiding piece is so placed that a radius of curvature is as large as possible.

* * * * *